(12) United States Patent
SuBenbach et al.

(10) Patent No.: US 7,226,233 B2
(45) Date of Patent: Jun. 5, 2007

(54) SNAP-IN COUPLING COMPRISING A SPRING CLAMP

(75) Inventors: Rainer SuBenbach, Steinhagen (DE); Jochen Rintelmann, Dresden (DE); Hans-Joachim Dembowsky, Hamburg (DE); Martin Jodeleit, Bielefeld (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 10/963,331

(22) Filed: Oct. 12, 2004

(65) Prior Publication Data

US 2005/0076484 A1 Apr. 14, 2005

(30) Foreign Application Priority Data

Oct. 14, 2003 (DE) .......................... 203 15 778 U

(51) Int. Cl.
*F16C 11/00* (2006.01)
*F16D 1/12* (2006.01)

(52) U.S. Cl. .................. 403/143; 403/76; 403/122; 403/140; 403/326

(58) Field of Classification Search ............. 403/135, 403/132, 134, 122, 143, 140, 142, 76, 326, 403/4, 3, 329, 397, DIG. 14; 411/516, 520, 411/388, 396, 431; 267/159
See application file for complete search history.

(56) References Cited

U.S. PATENT DOCUMENTS 2,922,670 A * 1/1960 Davies et al. ............... 403/134
3,753,582 A * 8/1973 Graham ...................... 285/305
3,759,555 A * 9/1973 Ito .............................. 403/122
3,856,422 A * 12/1974 Trefry ......................... 403/122
4,189,248 A 2/1980 Sully
4,226,550 A 10/1980 Kupcak et al. ............. 403/157
4,304,149 A * 12/1981 Heimann .................... 74/502.4
RE31,635 E * 7/1984 Smith et al. ................ 403/144
5,360,282 A * 11/1994 Nagengast et al. ......... 403/131
5,431,601 A * 7/1995 Nakamura .................. 464/175
6,206,604 B1* 3/2001 Dembowsky et al. ....... 403/135
6,227,751 B1* 5/2001 Kemmer et al. ............ 403/144

FOREIGN PATENT DOCUMENTS

DE 41 34 201 C1 11/1992
DE 198 36 108 A1 6/1999

* cited by examiner

*Primary Examiner*—Daniel P. Stodola
*Assistant Examiner*—Nahid Amiri
(74) *Attorney, Agent, or Firm*—Seyfarth Shaw LLP

(57) ABSTRACT

A snap-in coupling for releasably connecting a first structural member and a second structural member. The snap-in coupling comprises a female coupling member comprising a plastic support member and a metallic spring clamp, said support member being insertable into a socket provided at said first structural member such that the female coupling member is retained therein, and a male coupling member comprising a mounting portion for being fixed to said second structural member, and a head portion. Said spring clamp and said head portion are arranged to snappingly engage each other when said female coupling member and said male coupling member are inserted into each other.

13 Claims, 2 Drawing Sheets

SNAP-IN COUPLING COMPRISING A SPRING CLAMP

FIELD AND BACKGROUND OF THE INVENTION

The present invention relates to a snap-in coupling for releasably connecting a first structural member and a second structural member.

DE 198 36 108 A1 discloses a snap-in coupling comprising an elastically deformable female coupling member and a male coupling member. The female coupling member is adapted to be inserted into a socket provided at said first structural member so as to be positively retained therein. It comprises a spherical female portion, an annular intermediate wall integral therewith and serving as an insertion portion, and a tubular outer wall integral with said intermediate wall, which outer wall engages a peripheral wall of the socket when the female coupling portion is inserted into the socket. The male coupling member comprises a head portion and a mounting portion adapted to be fixed to the second structural member.

In this prior snap-in coupling the intermediate wall of the female coupling member is of conical shape and is stiffened by webs which extend between the tubular outer wall of the female coupling member and which are connected to the outside of the spherical female portion by radial ribs. The female coupling member is made of thermoplastic elastomeric material or rubber. This snap-in coupling has vibration dampening characteristics due to its geometry and the used material so that it provides for vibration decoupling between the first and second structural members.

German Utility Model 202 16 836 discloses a snap-in coupling wherein the annular intermediate wall of the female coupling member is not of conical shape but of an undulated or corrugated profile. This provides for resiliency not only in axial directions but also in radial directions. Therefore the female coupling member may perform vibration decoupling compensation movements both in axial and radial directions and, accordingly, in all directions therebetween, i.e. three-dimensional compensation movements in space.

This allows to make the female coupling member of relatively hard plastic material, for example an elastomeric material on the basis of chemically and thermally deformation resistant polyester. For example polybutylenetherephthalate (PBT) and polyethylenetherephthalate (PET) may be used.

These materials are of temperature dependent hardness. For example, when they are subject to extremely low temperatures down to −40° C. to be encountered in cold climatic zones they will become so hard that the snap-in coupling cannot be released by acceptable forces. Apart from the fact that the mounting and releasing forces are dependent on temperature it is relatively difficult to precisely set the absolute values of the mounting and, respectively, releasing forces for normal environmental conditions because the characteristics of the used plastic material as well as the geometry of the plastic female coupling member cannot be readily controlled.

SUMMARY OF THE INVENTION

It is an object of the present invention to provide a snap-in coupling wherein the forces for closing and opening of the snap-in coupling are substantially not dependent on temperature in a temperature range from about −40° to 150° C. and furthermore may be precisely controlled as to their absolute values. Furthermore, the snap-in coupling is to have vibration decoupling characteristics similar to those of the snap-in couplings in the prior art.

A snap-in coupling in accordance with the present invention has been defined in claim 1.

In the snap-in coupling of the present invention the female coupling member comprises a plastic support member and a metallic spring clamp. The spring clamp of the female coupling member and the head portion of the male coupling member are formed such that they provide for a snap-in connection frictionally joining the two coupling members when they are inserted into each other.

Use of a spring clamp which is preferably made from spring steel provides for the advantage that the mounting and dismounting forces of the snap-in coupling are substantially independent of temperature within the above mentioned temperature range. This results from the fact that the characteristics of the material and in particular the spring rate of the metallic spring clamp are substantially constant within said temperature range.

A further advantage of the present invention is that the absolute values of the mounting and dismounting forces of the snap-in coupling may be very precisely controlled and set by spring clamp characteristics such as material thickness, type of material, geometry, etc. The forces for closing and opening a certain snap-in coupling, therefore, are substantially less responsive to variations of the characteristics of the used plastic material than in the prior art.

Since the female coupling member consists not only of the metallic spring clamp but additionally of a plastic support member, the support member may be designed such that the snap-in coupling of the present invention will show substantially the same vibration decoupling characteristics as the above mentioned conventional snap-in couplings. Therefore the snap-in coupling of the present invention combines the advantageous properties of a metallic spring clamp and the vibration decoupling characteristics of a plastic coupling member.

While the spring clamp could be connected to the support member of the female coupling member so as to be releasable, preferably they are fixedly connected to each other by having a base plate of the spring clamp embedded in plastic material of the support member by injection moulding.

Preferably the spring clamp has a plurality of circumferentially spaced spring arms which snappingly engage the head portion of the male coupling member to provide said snap-in connection. The ends of the spring arms each comprise a holding portion and an insertion portion which are angled with respect to each other in V-shaped relationship. The head portion of the male coupling member has an annular groove matingly shaped with respect to the ends of the spring arms. As a result the insertion portion and the holding portion of the spring arms of the spring clamp may be shaped differently such that a smaller force is required to close the snap-in connection than to open the snap-in connection.

Preferably the support member of the female coupling member is made of a thermoplastic elastomeric material of optimal chemical and thermal deformation resistance while the spring clamp, as mentioned above, may be made of spring steel.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
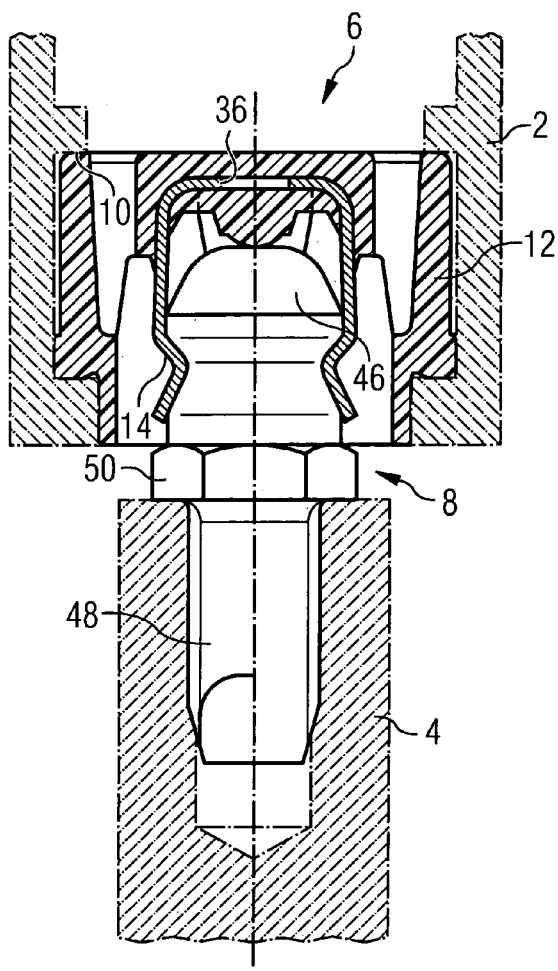
FIG. 1 is a longitudinal section through a snap-in coupling of the present invention in its mounted and closed condition.

The snap-in coupling as shown in FIG. 1 is intended to releasably join a structural member 2 and a structural member 4 which may be for example structural members of an automotive vehicle to be releasably connected to each other. The snap-in coupling consists of a female coupling member 6 and a male coupling member 8; the female coupling member 6 may be inserted into a socket 10 of the structural member 2, and the male coupling member 8 may be fixed to the structural member 4.

In the embodiment as shown, the socket 10 is formed by a recess of the structural member 2 which is of part annular or horseshoe-shape so that the female coupling member 6 may be laterally inserted into the socket 10. In any case the socket 10 may be of a design as shown in the above-mentioned DE 198 36 108 A1 or DE-GM 202 16 836 the disclosure of which is incorporated herein by reference.

Figure 2:
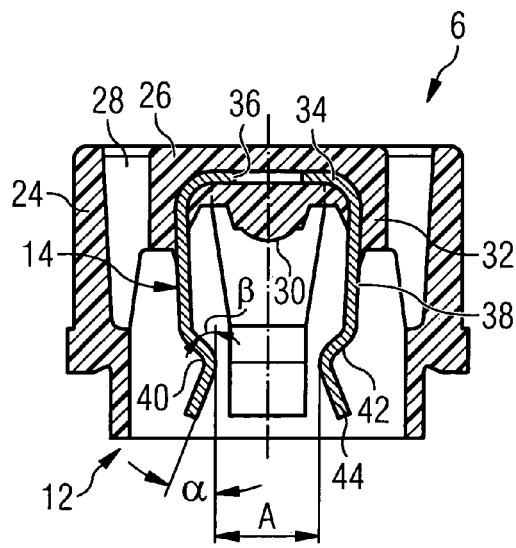
FIG. 2 is a longitudinal section through the female coupling member of the snap-in coupling in its disassembled condition.

As shown in FIGS. 1 and 2, the female coupling member 6 comprises a support member 12 and a spring clamp 14. In the embodiment as shown the support member 12 and the spring clamp 14 are fixedly connected to each other as will be explained in more detail below. As an alternative the spring clamp 14 may be connected to the support member 12 so as to be releasable therefrom, for example by snap-in or clip connection means or by thermal embedding.

As already mentioned above the support member 12 is made of plastic material, preferably of a thermoplastic elastomeric material, in particular on a polyester base such as polybutylenetherephthalate (PBT) or polyethyleneth-erephthalate (PET). While these materials are resiliently deformable, they are of a relatively high shore hardness, and excellent thermal deformation resistance (150° C. and more). Furthermore, they are of excellent chemical resistance, in particular diesel oil resistance. The spring clamp 14 is made of a metallic material, in particular spring steel.

Figure 3:
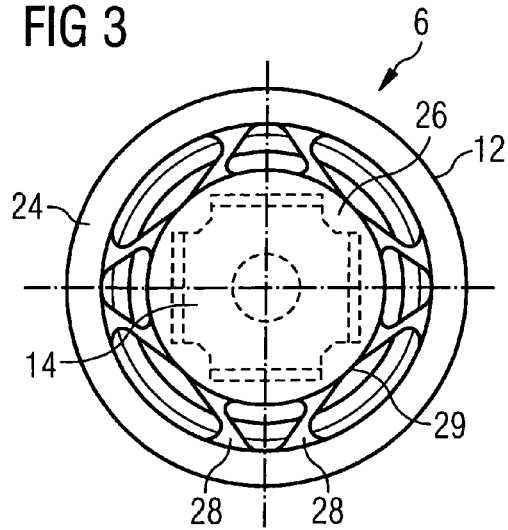
FIG. 3 is a top view of the female coupling member in FIG. 2.
Figure 4:
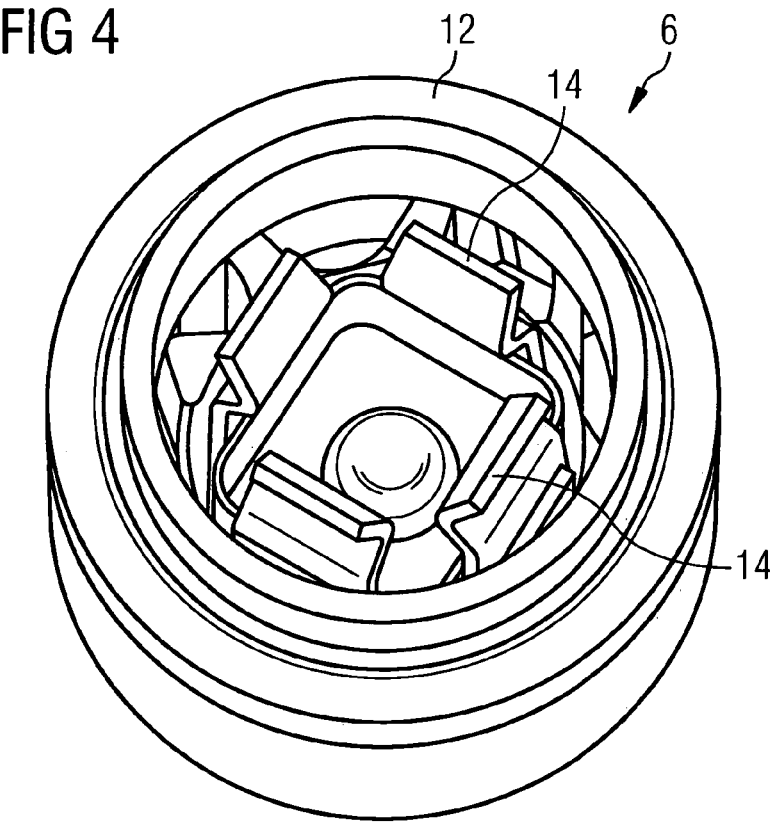
FIG. 4 is a perspective view of the female coupling member in FIGS. 2 and 3 from below.

The support member 12 comprises a tubular outer wall 24 adapted to be inserted into the socket 10, and a central portion 26 which are connected to each other by circumferentially spaced webs 28, see also FIGS. 3 and 4. Since the tubular outer wall 24 is of an axial length substantially exceeding that of the central portion 26, the webs 28 have inclined lower ends (in FIGS. 1, 2) and rectilinear upper ends (in FIGS. 1, 2).

As shown in FIG. 3 the webs 28 extend substantially tangentially with respect to a peripheral wall 29 of the central portion 26. The webs 28 are arranged in pairs such that the webs of any pair are directed in opposite circumferential directions. Due to this structure the webs 28 allow for relative movements between the tubular outer wall 24 and the central portion 26 in radial directions so as to provide for vibration decoupling of the snap-in coupling when in operation.

In the embodiment as shown the tubular outer wall 24 and the central portion 26 are connected to each other only by the substantially straight webs 28 so as to provide for minimal space requirements of the female coupling member 6. When more space is available, the outer wall 24 and the central portion 26 could be connected to each other by an annular intermediate wall of undulated or corrugated profile in longitudinal sections as shown and described in the above mentioned DE-GM 206 16 836. Since the shape and arrangement of such an intermediate wall with associated webs have been disclosed in the above German Utility Model in great detail, no further description thereof is required herein.

The central portion 26 of the support member 12 has on its bottom side (in FIGS. 1, 2) a central lens-shaped projection 30 the purpose of which will be explained further below.

The spring clamp 14 comprises a base plate 34 having a central hole 36 and a plurality of spring arms 38 (four spring arms in the embodiment as shown). The spring arms 38 are integral with the base plate 34 and bent therefrom for more than 90° when they are in a relaxed condition so that they provide for a square periphery in the bottom view of FIG. 3 for uniformly engaging the male coupling member 8 as will explained in more detail below.

The spring clamp 14 is fixedly connected to the support member 12 by the base plate 34 and a small adjacent part of the spring arms 38 being embedded in the material of the support member 12 as shown in FIGS. 1 and 2. This is accomplished during manufacture of the support member 12 by injection moulding. A core within the injection-moulding tool holds the spring clamp 14, and plastic material is injected about the spring clamp. Since plastic material flows also into the central hole 36 of the base plate 34 and since a small part of the spring arms 14 is enclosed by plastic material of an annular projection 32 of the central portion 26, positive interlocking between the support member 12 and the spring clamp 14 will result.

As an alternative these members could be connected to each other by releasable connection means such as snap-in or clip means, thermal embedding, or the like.

Each of the spring arms 38 has a terminal end 40 bent radially inwards to snappingly engage the male coupling member 8. Each terminal end 40 comprises a holding portion 42 and an insertion portion 44 which are inclined with respect to each other in V-shaped relationship. As shown in FIG. 2, the insertion portion 44 is inclined with respect to the central axis of the snap-in coupling by an angle α which is smaller than a respective angle β of the holding portion 42. As shown the angle α is in the order of 25°, and the angle β is in the order of 45°. It should be noted, however, that other angles may be appropriate in other applications. Due to the difference between the angles α and β closing of the snap-in coupling requires a smaller force than opening the snap-in coupling as will explained in more detail below.

Figure 5:
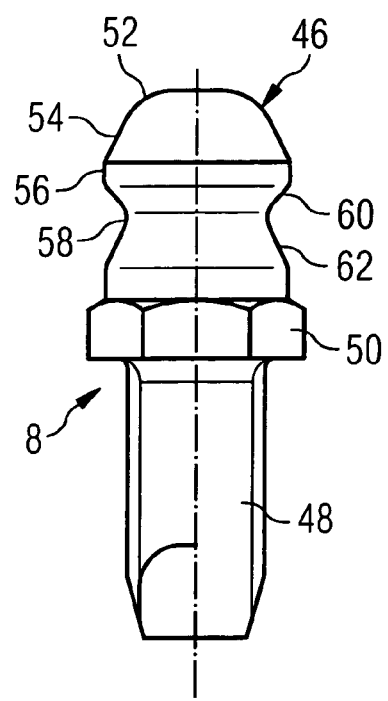
FIG. 5 is a side elevation of the male coupling member of the snap-in coupling in FIG. 1.

As shown in FIGS. 1 and 5 the male coupling member 8 comprises a head portion 46, a mounting portion 48, and a drive portion 50 disposed therebetween.

Head portion 46 is provided with a radiused end surface 52 which is followed by a conical surface 54. The conical surface 54 is followed by a substantially cylindrical surface 56. The head portion 46 is provided with an annular groove 58 adjacent to said cylindrical surface 56.

The annular groove 58 of the head portion 46 and the radially inwards bent terminal ends 40 of the spring arms 38 of the spring clamp 14 are of substantially mating shapes. More particularly the annular groove 58 of the head portion 56 comprises a pair of inclined conical surfaces 60 and 62. The cone angle of the surface 62 is similar to angle α of the insertion portions 44 of the spring arms 38, and the cone angle of the surface 60 is similar to the angle β of the holding portions 42 of the spring arms 38. The cone angle of the conical surface 54 is also similar to the angle α of the insertion portions 44 of the spring arms 38 so that the conical surface 54 can perform a centering action upon the male coupling member 8 when the coupling is being closed as will be explained in more detail below.

The mounting portion 48 of the male coupling member 8 is formed as a threaded portion, and the drive portion 50 is of hexagonal shape for being engaged by a respective tool. As a result the male coupling member 8 may be threaded into a respective bore of the structural member 4; it is to be noted that the threads of the mounting portion 48 could be formed as self-cutting threads. It should be noted that the mounting portion 48 could be of any other structure and may be even an integral portion of the structural member 4.

Operation of the snap-in coupling as described is as follows:

When the coupling members 6 and 8 have been fixedly connected to its associated structural members 2 and 4, closing of the snap-in coupling merely requires to insert the coupling members 6, 8 into each other by relative movement of the structural member 2 and 4 along the central axis whereby the spring clamp 14 of the female coupling member 6 and the head section 46 of the male coupling member 8 snappingly engage each other automatically.

As indicated in FIG. 2 any two diametrically opposite spring arms 38 when in a relaxed condition are spaced from each other by a predetermined minimal distance A. This distance is smaller than the minimal diameter of the annular groove 56 of the head portion 46 for a predetermined amount in order to have the spring arms 38 engage the head portion 46 under a predetermined biasing force when the snap-in coupling has been closed.

While the coupling members 6 and 8 are being inserted into each other, the insertion portions 44 of the spring arms 38 initially slide along the conical surface 54 of the head portion 46 whereby the spring arms 38 are resiliently deflected in an outward direction so as to perform a centering action between the head portion 46 and the spring clamp 14. As soon as the insertion portions 44 of the spring arms 38 have been moved beyond the cylindrical surface 56 of the head portion 46, the spring arms 38 "snap" radially inwards so that the radially inwards bent terminal ends 40 snappingly engage into the annular groove 58 of the head portion 46. The terminal ends 40 which are arranged so as to form a square (see FIGS. 3 and 4) now uniformly contact the annular head portion 46. In particular the holding portions 42 of the terminal ends 40 engage the conical surface 60 of the head portion 46, and the insertion portions 44 of the terminal ends 40 engage the conical surface 62 of the head portion 46. Due to the linear shape of the terminal ends 40 and the circular shape of the head portion 46, line contact between these surfaces will result.

Relative insertion movements of the coupling members 6 and 8 are limited by having the arcuate end surface 52 of the head portion 46 engage the lens-shaped projection 30 of the support member 12. A point-contact between the support member 12 of resiliently deformable plastic material and the head portion 46 allows for compensation of manufacture tolerances of the involved members. Furthermore abutment between the lens-shaped projection 30 of the support member 12 and the spherical end surface 52 of the head portion 46 provides for playless engagement between the spring clamp 14 and the head portion 46.

Opening the snap-in coupling merely requires to move the structural members 2 and 4 away from each other in an axial direction so as to release the snap-in connection between the spring clamp 14 and the head portion 46. Since the angle α of the insertion portions 44 of the spring arms 38 (and of the conical surface 44 of the head portion 46) is smaller than the angle β of the holding portions 42 (and of the conical surface 60 of the head portion 46), the dismounting force for opening the snap-in coupling substantially exceeds the mounting force necessary for closing the snap-in coupling. This allows to secure the snap-in coupling from being opened inadvertently without resulting in excessive mounting forces.

The resilient properties of the spring clamp 14 made of spring steel are substantially invariable within a temperature range of e.g. from −40° to 150° C. The mounting and dismounting forces of the snap-in coupling are, therefore, independent of temperature, apart from a certain temperature dependent behaviour of the plastic support member 12. Furthermore, the values of the mounting and dismounting forces of the snap-in coupling may be precisely controlled and set by the characteristics of the used materials and the structure (geometry, material thickness, number of spring arms, etc.) of the spring clamp 14, while the mounting and dismounting forces may be selected to differ from each other in the desired manner by respective selection of the angles α and β. Due to the support member 12 with its webs 28 being made of plastic material and due to a possibly present intermediate wall of undulated profile, the snap-in coupling has excellent vibration decoupling properties which are similar to those of the snap-in couplings in the above mentioned publications.

We claim:

1. A snap-in coupling for releasably connecting a first structural member and a second structural member, said snap-in coupling comprising:

a female coupling member comprising a plastic support member for being retained in said first structural member, and a metallic spring clamp including a base plate connecting said spring clamp to said support member, said base plate having a central bore completely embedded in plastic material of said support member, said plastic material also being present within said central bore, said support member comprising a tubular outer wall insertable into a socket provided at said first structural member such that the female coupling member is retained therein, and a male coupling member comprising a mounting portion for being fixed to said second structural member; and a head portion, said spring clamp including a plurality of circumferentially spaced spring arms which engage said head portion to cause said spring clamp and said head portion to snappingly engage each other when said female coupling member and said male coupling member are inserted into each other, said spring clamp having a portion embedded into said plastic material of said support member.

2. The snap-in coupling of claim 1 wherein the spring arms of said spring clamp are integral with said base plate of the spring clamp and are bent therefrom under an angle such that diametrically opposite spring arms are internally spaced from each other for a distance which is less than a respective dimension of said head portion when the spring clamp is in a relaxed condition.

3. The snap-in coupling of claim 2 wherein each of said spring arms has a radially inwards bent end snappingly engaging into an annular groove of said head portion for providing said snap-in connection.

4. The snap-in coupling according to claim 3 wherein said radially inwards bent end of each spring arm comprises a holding portion and an insertion portion which are inclined to each other in V-shaped relationship.

5. The snap-in coupling of claim 4 wherein said insertion portion of said end of each spring arm is inclined with respect to a central axis of the snap-in coupling for a smaller angle than said holding portion such that closing said snap-in connection requires a smaller force than releasing said snap-in connection.

6. The snap-in coupling of claim 5 wherein the annular groove of said head portion and said ends of said spring arms are matingly shaped with respect to each other.

7. The snap-in coupling of claim 1 wherein said support member of said female coupling member comprises a central support portion connected to said tubular outer wall by circumferentially spaced webs.

8. The snap-in coupling of claim 7, wherein said webs extend substantially tangentially with respect to a peripheral wall of said support portion of said support member.

9. The snap-in coupling of claim 8 wherein said support portion of said support member has a lens-shaped projection which, when said snap-in connection is closed, engages a rounded end surface of said head portion so as to limit insertion of said male and female coupling members with respect to each other and ensure playless engagement between said spring clamp and said head portion.

10. The snap-in coupling of claim 9 wherein said rounded end surface of said head portion is followed by a conical surface for centering said head portion when said snap-in, connection is closed.

11. The snap-in coupling of claim 1 wherein said male coupling member has a drive portion disposed between said head portion and said mounting portion.

12. The snap-in coupling of claim 1 wherein said female coupling member is made of a thermoplastic elastomeric material.

13. The snap-in coupling of claim 1 wherein said spring clamp is made of spring steel.

* * * * *